(12) United States Patent
Uchida (10) Patent No.: US 9,190,092 B1
(45) Date of Patent: Nov. 17, 2015

(54) MAGNETIC RECORDING MEDIUM AND METHOD FOR PRODUCING THE SAME

(71) Applicant: FUJI ELECTRIC CO., LTD., Kawasaki-shi (JP)

(72) Inventor: Shinji Uchida, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 0 days.

(21) Appl. No.: 14/580,290

(22) Filed: Dec. 23, 2014

Related U.S. Application Data (62) Division of application No. 12/926,393, filed on Nov. 15, 2010, now Pat. No. 8,945,364.

(30) Foreign Application Priority Data

Nov. 18, 2009 (JP) ................................. 2009-262537

(51) Int. Cl.
| | | |
|---|---|---|
| G11B 5/74 | (2006.01) | |
| G11B 7/2407 | (2013.01) | |
| G11B 5/82 | (2006.01) | |
| G11B 5/84 | (2006.01) | |
| G11B 7/2405 | (2013.01) | |

(52) U.S. Cl.
CPC *G11B 5/74* (2013.01); *G11B 5/743* (2013.01); *G11B 5/746* (2013.01); *G11B 7/2407* (2013.01); *G11B 5/82* (2013.01); *G11B 5/84* (2013.01); *G11B 7/2405* (2013.01)

(58) Field of Classification Search
None
See application file for complete search history.

(56) References Cited

U.S. PATENT DOCUMENTS

| | | | |
|---|---|---|---|
| 5,679,473 A | 10/1997 | Murayama et al. | |
| 5,866,895 A * | 2/1999 | Fukuda et al. | ................ 235/494 |
| 8,958,177 B2 * | 2/2015 | Kikitsu et al. | ................ 360/135 |
| 2002/0086185 A1 * | 7/2002 | Yasui et al. | ............. 428/694 TS |
| 2002/0168548 A1 * | 11/2002 | Sakurai et al. | .......... 428/694 BR |
| 2003/0198832 A1 | 10/2003 | Nakamura et al. | |
| 2006/0061900 A1 | 3/2006 | Ohtsuka et al. | |
| 2006/0177703 A1 | 8/2006 | Takenoiri et al. | |
| 2006/0286345 A1 | 12/2006 | Nakao | |
| 2008/0002269 A1 | 1/2008 | Sakurai et al. | |
| 2009/0097152 A1 | 4/2009 | Gao et al. | |

FOREIGN PATENT DOCUMENTS

| | | |
|---|---|---|
| EP | 0860816 A1 | 8/1998 |
| JP | 10-233015 A | 9/1998 |
| JP | 10-320772 A | 12/1998 |
| JP | 2002-175621 A | 6/2002 |
| JP | 2002-334414 A | 11/2002 |
| JP | 2003-123239 A | 4/2003 |

(Continued)

*Primary Examiner* — Wayne Young
*Assistant Examiner* — Carlos E Garcia
(74) *Attorney, Agent, or Firm* — Rabin & Berdo, P.C.

(57) ABSTRACT

A patterned magnetic recording medium, accessible by a magnetic recording head, including a plurality of tracks, a width direction of each track and that of the magnetic recording head being of a skew angle. The patterned magnetic recording medium includes a plurality of magnetic dots, each corresponding to a recording bit, formed on a non-magnetic material. The plurality of magnetic dots are arranged in a plurality of arrays, each array corresponding to one of the tracks. Every N adjacent magnetic dots of the array define a polygon, one side thereof being parallel to the corresponding track, and another side thereof being parallel to a direction determined by the skew angle of the corresponding track.

4 Claims, 7 Drawing Sheets

(56) References Cited

FOREIGN PATENT DOCUMENTS

| JP | 2003-242623 A | 8/2003 |
| JP | 2006-048900 A | 2/2006 |
| JP | 2006-073137 A | 3/2006 |
| JP | 2006-346820 A | 12/2006 |
| JP | 2007-103008 A | 4/2007 |
| JP | 2008-016072 A | 1/2008 |
| JP | 2009-110642 A | 5/2009 |

\* cited by examiner

MAGNETIC RECORDING MEDIUM AND METHOD FOR PRODUCING THE SAME

CROSS-REFERENCE TO RELATED APPLICATION

This application is a divisional of application Ser. No. 12/926,393, filed on Nov. 15, 2010 and issued on Feb. 3, 2015 as U.S. Pat. No. 8,945,364. Furthermore, this application claims the benefit of priority of Japanese application 2009-262537, filed Nov. 18, 2009. The disclosures of the prior U.S. and Japanese applications are incorporated herein by reference.

BACKGROUND OF THE INVENTION

1. Field of the Invention

The present invention relates to a magnetic recording medium and a method for producing the same. Particularly, it relates to a perpendicular magnetic recording medium having a magnetic recording pattern formed therein and a method for producing the perpendicular magnetic recording medium.

2. Description of the Background Art

A stationary magnetic storage device (hard disk drive) is used as one of information recording devices for supporting recent sophisticated information society. Improvement in recording density is required of a magnetic recording medium used in the magnetic storage device with the increase in quantity of information. To achieve high recording density, a unit in which inversion of magnetization occurs must be small-sized. To this end, it is important that magnetic grain size is reduced and the unit of inversion of magnetization is separated and partitioned clearly to reduce magnetic interaction between adjacent recording units.

As a technique for achieving higher-density magnetic recording, a perpendicular magnetic recording method has been recently used in place of a longitudinal magnetic recording method. As a magnetic recording layer material for use in a perpendicular magnetic recording medium, a CoCr alloy crystalline film having a hexagonal close-packed structure (hcp structure) is discussed chiefly at present. Perpendicular magnetic recording is performed while crystal orientation is controlled so that a c axis of the hcp structure is perpendicular to the film surface (i.e. a c surface is parallel to the film surface).

Approaches to refinement of crystal grains forming the CoCr alloy crystalline film, reduction of the grain size distribution, reduction of magnetic interaction between grains, etc. have been proposed to cope with further increase in density of the magnetic recording medium in future.

As a magnetic layer structure control method for higher magnetic recording density, there is a method using a magnetic layer having a structure in which the periphery of a magnetic crystal grain is surrounded by a non-magnetic non-metal substance such as oxide or nitride, generally called granular magnetic layer. Low noise characteristic is obtained in the granular magnetic film because the grain boundary phase of the non-magnetic non-metal substance separates magnetic grains physically so that magnetic interaction between magnetic grains is lowered to thereby suppress zigzag domain walls from being formed in a recording bit transition region.

Generally, a perpendicular magnetic recording medium using Ru as an underlying layer and using a CoPtCrO alloy having a granular structure as a magnetic layer has been proposed. As the thickness of the Ru layer which is the underlying layer located under the granular magnetic layer is increased, c axis orientation is improved. Excellent magnetic characteristic and electromagnetic transducing characteristic are obtained with the improvement of c axis orientation.

It has been reported that when RF sputtering film formation is performed by using a CoNiPt target containing oxide such as $SiO_2$, a granular recording film having a structure in which respective magnetic crystal grains are surrounded by non-magnetic oxide so as to be separated individually can be formed to thereby achieve low noise characteristic (e.g. see U.S. Pat. No. 5,679,473, and so on). It is conceived that low noise characteristic is obtained in such a granular magnetic film because the grain boundary phase of the non-magnetic non-metal substance separates magnetic grains physically so that magnetic interaction between the magnetic grains is lowered to thereby suppress zigzag domain walls from being formed in a recording bit transition region.

When a crystal orientation control layer having the same crystal structure, that is, the same hcp structure as that of ferromagnetic crystal grains of the magnetic layer is provided, Co grains of the magnetic layer is grown on the crystal orientation control layer corresponding to a crystalline substance (crystal grains) of the crystal orientation control layer and that oxide is precipitated and grown in the magnetic layer corresponding to a crystal grain boundary porous region or amorphous region of the crystal orientation control layer. In other words, there is a proposal that crystal grains of the magnetic layer are grown epitaxially on crystal grains of the crystal orientation control layer, so that crystal orientation of the crystal orientation control layer is taken over to the magnetic layer to thereby make it possible to control the crystal orientation of the magnetic layer, and that an amorphous phase crystal gain boundary interposed in the periphery of crystal grains forming the magnetic layer is formed to thereby make it possible to control the crystal state of the magnetic layer having a granular structure (e.g. see JP-A-2003-123239, JP-A-2003-242623, and so on).

It has been reported that when a magnetic layer of a perpendicular magnetic recording medium includes a first magnetic layer of a granular structure and a second magnetic layer of a non-granular structure, good electromagnetic transducing characteristic and high durability can be guaranteed (e.g. see JP-A-2007-103008, and so on).

In order to improve easiness of recording without spoiling thermal stability, there has been proposed a layer structure including a first magnetic recording layer and a second magnetic recording layer which are ferromagnetically coupled to each other while a coupling layer is interposed therebetween. It has been reported that at least one of the first magnetic recording layer and the second magnetic recording layer preferably has a granular structure (e.g. see JP-A-2006-48900, and so on).

In such a granular perpendicular magnetic recording medium, relatively good magnetic characteristic and electromagnetic transducing characteristic are obtained. The granular perpendicular magnetic recording medium proposed heretofore was however a continuous film in plan view, that is, a so-called solid film. To achieve higher recording density, it is necessary to prevent writing from being blurred in adjacent tracks, reduce the formation of zigzag domain walls due to grains arranged at random, reduce the influence of thermal fluctuation due to reduction in crystal grain size, and reduce magnetic interaction between magnetic grains as much as possible.

Therefore, a discrete track medium has been proposed. The unit in which magnetization is inverted is partitioned clearly, that is, a magnetic substance row in which intervals of tracks are magnetically completely separated is formed to obtain an adjacent track boundary artificially. Writing can be prevented from being blurred in the adjacent tracks, and zigzag domain walls can be prevented from being formed.

Further, a patterned medium has attracted attention. As the patterned medium, there has been proposed a patterned medium in which dots separated into single domains made uniform artificially in shape and size are arranged as an array so that each single magnetic material dot is used as a single recording bit for performing recording and reproducing (e.g. see JP-A-10-233015, and so on).

Although various techniques known heretofore can be used as a method of forming a structure in which a magnetic material of a patterned medium is separated, improvement is required because each of the techniques has advantages and disadvantages. For example, photolithography has an advantage in terms of throughput because of batch exposure but comes with such difficulty that a large area of the magnetic recording medium is exposed to light in batch with a fine pattern of dozen nm. Although an electron beam lithography method or a converged ion beam method can form a fine pattern of dozen nm because an electron beam or a converged ion beam is irradiated while following along the pattern, the electron beam lithography method or the converged ion beam method is not realistic in terms of processing cost based on processing time because few days are required for processing all the large area of the magnetic recording medium.

Several methods using self-assembling have been proposed as a method for solving this disadvantage. For example, there has been proposed a method of producing a magnetic recording medium, in which fine grains with a diameter in a range of from the order of nanometers to the order of micrometers are two-dimensionally arranged on a substrate and patterning is performed with the fine grains as a mask to thereby form magnetic fine grains isolated on the substrate (e.g. see JP-A-10-320772, and so on).

A pattern forming method using a self-assembling phase separation structure of a block copolymer has been proposed (e.g. see P. Mansky et al, Appl. Phys. Lett., vol. 68, p. 2586, M. Park et al, Science, vol. 276, p. 1401, and so on). The method using a block copolymer can form a regularly arranged pattern by a very simple process of dissolving the block copolymer in a suitable solvent and applying the resulting solvent on a piece to be processed. Generally, the phase separation structure of the block copolymer is self-assembled as a honeycomb hexagonal close-packed lattice.

A magnetic recording medium which uses a self-assembling arrangement structure of anodized alumina pores so that the alumina pores are filled with magnetic metal has been also proposed (e.g. see JP-A-2002-175621, and so on). The magnetic recording medium has an underlying electrode layer and anodized alumina pores in this order on a substrate. The anodized alumina pores are formed so that a large number of alumina pores are arranged orderly. The alumina pores are filled with ferromagnetic metal to thereby form a ferromagnetic layer. Incidentally, the anodized alumina pores are generally self-assembled in the form of a honeycomb hexagonal close-packed lattice.

According to the arrangement of fine grains, the self-assembling of block copolymer and the self-assembling of anodized alumina, a fine array can be formed in a large area at low cost. Although the arrangement based on this method is provided as a two-dimensional arrangement which is well-ordered at a relatively short distance among dozen fine grains, the arrangement is disordered at a long distance and exhibits an aspect of a polycrystalline substance so that a large number of defective places occur when the magnetic recording medium is viewed as a whole.

Several methods have been proposed to solve this problem to thereby keep the whole magnetic recording medium well-ordered. For example, there has been proposed a method in which: a concave-convex line is formed on a substrate; fine grains are arranged as a patterned single layer on the concave-convex line; the arrangement pattern of the fine grains is transferred onto a stamper-forming material to thereby form a stamper; and a start point for forming nano-holes is formed on a metal substrate by using the stamper; and a nano-hole forming process is applied to the metal substrate (e.g. see JP-A-2006-346820, and so on). Or as for a method using self-assembling of a block copolymer, there has been proposed a recording medium having a structure in which: cells shaped like parallelograms surrounded by separation regions containing substantially parallel straight lines along a track direction and substantially parallel straight lines intersecting the first-mentioned straight lines at an angle of 60° or 120° are formed on a disk substrate; and a granular recording material is arranged to assemble a regular lattice in each of the cells (e.g. see JP-A-2002-334414, and so on).

As described above, there have been proposed various methods in which a recording unit for performing magnetic recording is made from a fine pattern to improve recording density. The methods of simply making the recording unit fine are however not enough to effectively perform an actual read/write operation used in a hard disk drive.

Figure 1:
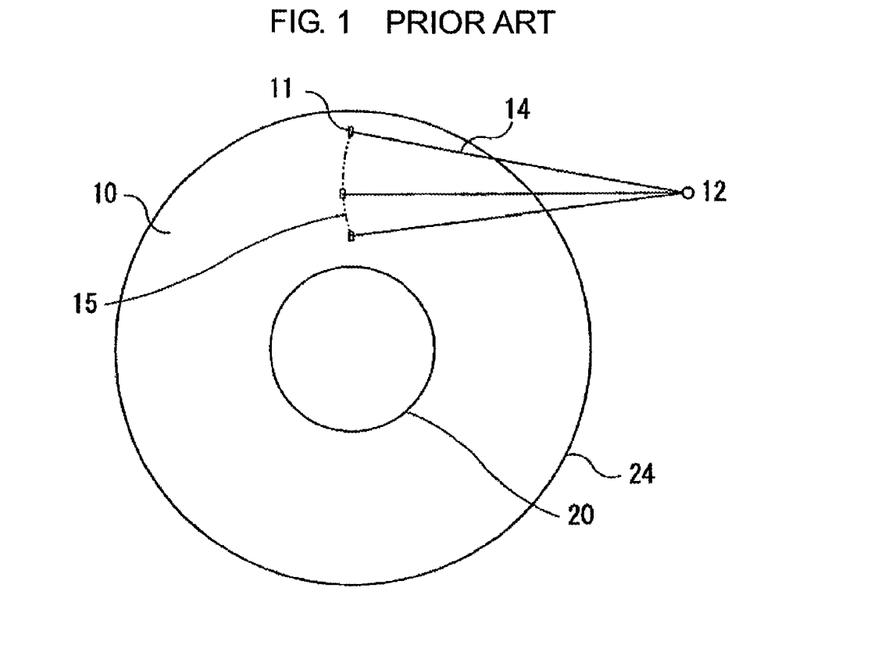
FIG. 1 is a schematic view showing a locus of movement of a magnetic recording head in a hard disk drive when information is recorded/read on/from a magnetic recording medium by the magnetic recording head.

FIG. 1 is a schematic view showing a locus of movement of a magnetic recording head (hereinafter also referred to as head simply) when information is recorded/read on/from a magnetic recording medium by the magnetic recording head. To scan a recording portion of a disk-like magnetic recording medium 10 having a hole of an inner circumference 20 in its central portion and an outer circumference 24, a magnetic recording head 11 fixed to a head arm 14 makes a seeking operation between the inner circumferential side and the outer circumferential side of the doughnut-shaped magnetic recording medium by using a rotation center 12 of the head as a pivot to thereby form a locus 15 of the head. In a hard disk drive, magnetic recording is performed along a circumferential direction which is a track direction of the magnetic recording medium. Accordingly, a read/write element of the head (hereinafter referred to as "head RW element" for short) and a track intersect each other at an angle of intersection of the track direction and the locus of the head. An angle between the track width direction of the magnetic recording medium and the track width direction of the magnetic recording head is called skew angle.

Figure 2:
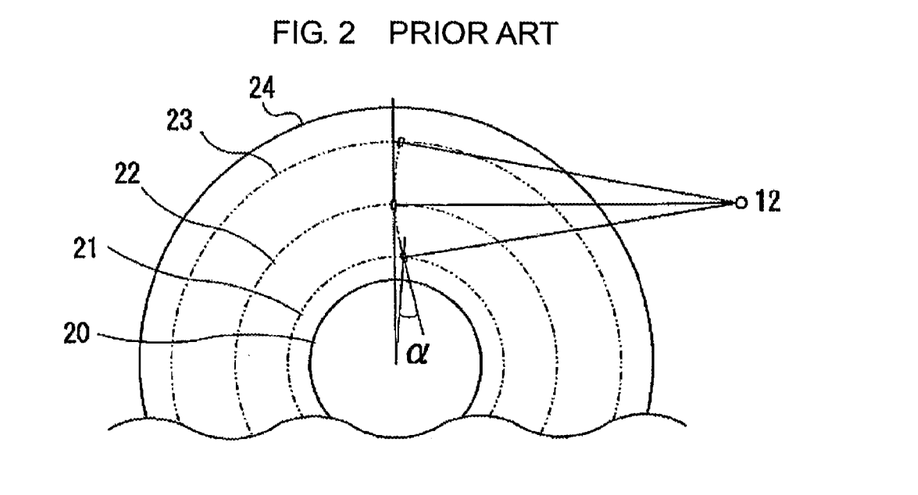
FIG. 2 is a schematic view showing a state where a skew angle varies according to the radial track position.

FIG. 2 is a schematic enlarged view of an upper half of the magnetic recording medium showing a state where the skew angle $\alpha$ varies according to the radial track position. For example, on an intermediate circumference 22 in the radial direction of the magnetic recording medium, the radial direction (track width direction) of the magnetic recording medium and the track width direction of the head RW element coincide with each other, so that the skew angle is 0°. However, at other points, the radial direction of the magnetic recording medium and the direction of the head do not coincide with each other. On an inner circumference 21 in the radial direction of the magnetic recording medium, the skew angle is $\alpha$°. On the outer circumference 23 in the radial direction of the magnetic recording medium, the skew angle is not 0° likewise. Generally, in a hard disk drive, the skew angle is allowed to be up to about ±15°.

In the background-art magnetic recording medium in which a magnetic recording layer is formed uniformly on the whole surface of the magnetic recording medium, the magnetic recording layer is present in the position of the head RW element even if there was the skew angle. The magnetic recording layer may be however absent in the position of the head RW element when the magnetic recording layer is patterned to be made from magnetic dots.

Figure 3:
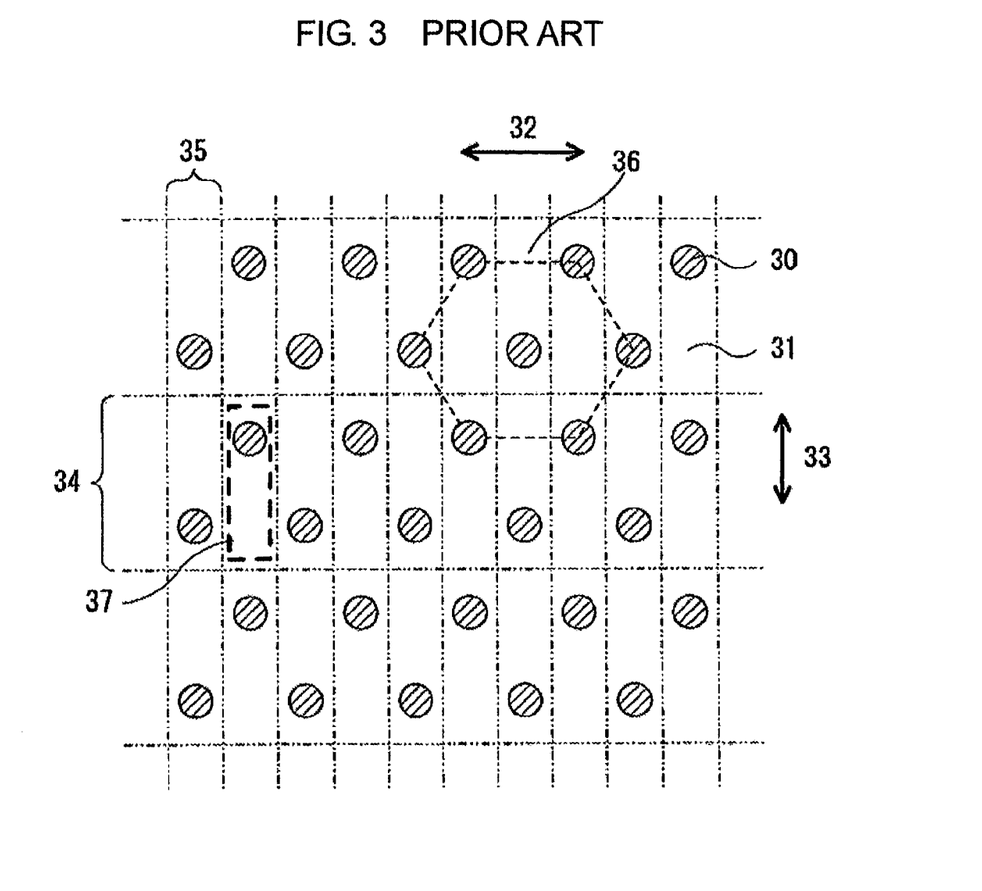
FIG. 3 is a schematic view showing the case where the skew angle is 0° for explaining a state where the positional relation between a head RW element and a patterned magnetic dot varies according to the skew angle.
Figure 4:
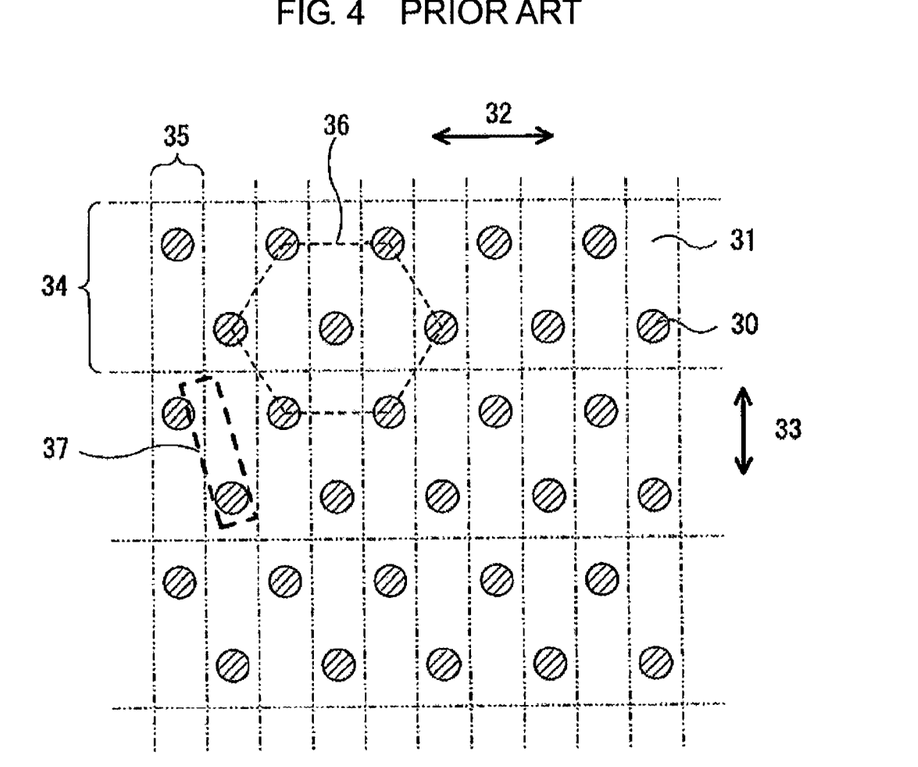
FIG. 4 is a schematic view showing the case where the skew angle is large in arrangement of magnetic dots without consideration of the skew angle for explaining a state where the positional relation between a head RW element and a patterned magnetic dot varies according to the skew angle.

FIGS. 3 and 4 are schematic enlarged views showing a part of an upper surface of the magnetic recording layer of the magnetic recording medium for explaining a state where the positional relation between the head RW element and each patterned magnetic dot varies according to the skew angle. The magnetic recording layer is made from magnetic dots 30 which are arranged in a non-magnetic substance 31 to have such a predetermined pattern that one magnetic dot 30 is disposed in each rectangle formed from a track width 34 and a bit width 35. On the assumption that anodized alumina is self-assembled into pores shaped like a honeycomb hexagonal close-packed lattice, there is shown the case where six magnetic dots adjacent to a certain magnetic dot are substantially shaped like a hexagon 36. Arrows in FIGS. 3 and 4 express a track direction 32 of the magnetic recording medium and a radial direction 33 of the magnetic recording medium, respectively. A position where the head RW element is projected onto the magnetic recording medium is shown as a projection 37 of the head RW element.

Each of FIGS. 3 and 4 shows the case where the magnetic dots 30 are lined up and arranged regularly along the radial direction of the magnetic recording medium. FIG. 3 shows the case where the skew angle is 0°. FIG. 4 shows the case where the skew angle becomes large. In the case of FIG. 3, it is possible to read/write information without affecting other bits because one magnetic dot 30 corresponds to each projection 37 of the head RW element. When the skew angle becomes large, the projection 37 of the head RW element however comes out of the rectangle formed from the track width 34 and the bit width 35, as shown in FIG. 4. Consequently, it is known that it is impossible to read/write information accurately because the head RW element interferes with magnetic dots of adjacent bits.

A method of changing the arrangement of magnetic dots in accordance with the skew angle has been proposed (e.g. see JP-A-2006-73137) in order to avoid interference with adjacent bits even when the skew angle changes. In the proposed method, magnetic dots are made of nano-holes each filled with a magnetic material. To form the nano-holes, a line groove is formed and a row of nano-holes is formed in the line groove to thereby arrange magnetic dots. The direction of the line groove is changed according to the radial position of the magnetic recording medium to thereby arrange magnetic dots so that the direction of arrangement of the magnetic dots is substantially the same as the track width direction of the RW element of the magnetic recording head. According to the method, the same micro-fabrication level as that of the adjacent bit width is required as the minimum width of patterning. It is however considerably difficult to perform the same micro-fabrication as that of the bit width because the bit width is very fine.

It is preferable that one recording bit is made from one magnetic dot in order to reduce magnetic interaction between magnetic dots. When recording density is intended to be increased, however, it is necessary to reduce the bit size which is the smallest unit of information recording and it is therefore necessary to reduce the size of the magnetic dot. Accordingly, a higher-grade micro-fabrication technique is required for arranging such a small magnetic dot in a desired position.

SUMMARY OF THE INVENTION

An object of the invention is to provide a recording medium which is provided with fine magnetic dots formed and arranged to assemble a regular lattice in accordance with a skew angle while the position of each magnetic dot is controlled based on the bit size level and which is free from disorder of arrangement of a recording material and from occurrence of defects, and to provide a producing method in which an overload is not imposed on micro-fabrication while magnetic dots are arranged desirably.

The invention is based on the finding that when a cell of a minute cavity is formed in a substrate in advance and nano-hole formation is performed in the minute cavity cell by anodic oxidization under an appropriate voltage, nano-holes are formed regularly in corners of the cell.

To achieve the foregoing object, the magnetic recording medium according to the invention is a patterned magnetic recording medium including: magnetic dots provided in such a manner that a magnetic material is partitioned by a non-magnetic material; wherein: the magnetic dots are arranged as a predetermined array in accordance with each track in a data recording region of the magnetic recording medium; the array is formed so that one magnetic dot is disposed in accordance with each recording bit while three or four magnetic dots adjacent in the track direction form a polygon; and one side of the polygon is parallel to the track direction while at least one of other sides of the polygon is parallel to a direction determined by a skew angle of a magnetic recording head in the track position.

The predetermined array may be set in accordance with each group of adjacent tracks in a data recording region of the magnetic recording medium.

Preferably, the polygon is a parallelogram, and a pair of parallel sides of the parallelogram are parallel to the track direction while the other pair of parallel sides of the parallelogram are parallel to a direction determined by the skew angle.

The method of producing a magnetic recording medium according to the invention is a method of producing a patterned magnetic recording medium including magnetic dots provided in such a manner that a magnetic material is partitioned by a non-magnetic material, including the steps of: forming at least an aluminum layer on a non-magnetic substrate; forming polygonal cavity portions in the aluminum layer; forming nano-holes by an anodic oxidation method so that one nano-hole is formed only in each of the corners of the cavity portions; and depositing a magnetic material in each of the nano-holes.

According to the invention, a plurality of magnetic dots can be formed in each cavity portion, so that it is possible to make micro-fabrication easy compared with the case where one magnetic dot is produced in one cavity. Particularly, the electron beam drawing time required for forming a master used in nano-printing can be shortened greatly so that the magnetic recording medium can be produced at low cost.

According to the invention, one bit can be recorded based on one magnetic dot, so that it is possible to achieve great improvement of recording density compared with the case where one bit is obtained based on a plurality of magnetic dots. Hence, it is possible to obtain a magnetic recording medium which can support higher density recording. Based on the method of producing a magnetic recording medium according to the invention, the magnetic recording medium can be produced by a simple method, so that it is possible to provide a perpendicular magnetic recording medium excellent in productivity and characteristic.

BRIEF DESCRIPTION OF THE DRAWINGS

FIGS. 7A to 7G are schematic views for explaining an example of a producing method according to the invention.

DETAILED DESCRIPTION OF THE INVENTION

A magnetic recording medium according to the invention will be described in detail with reference to the drawings.

Figure 5:
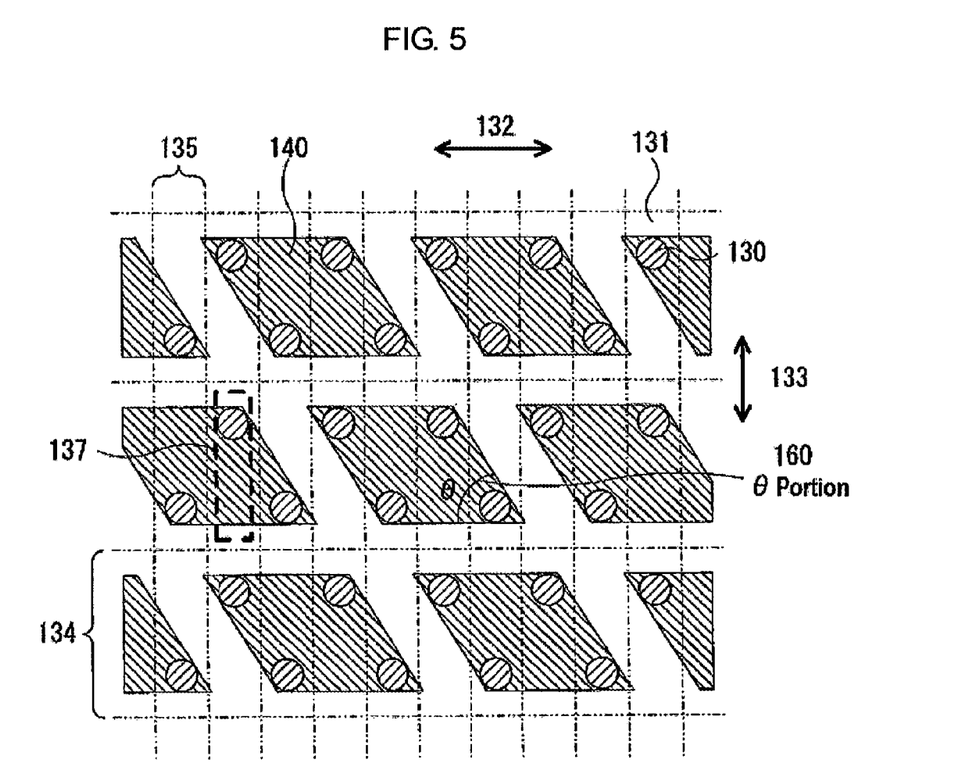
FIG. 5 is a schematic view showing an example in which magnetic dots are arranged in four corners of each magnetic dot alignment cavity portion shaped like a parallelogram in order to explain an embodiment of the invention.
Figure 6:
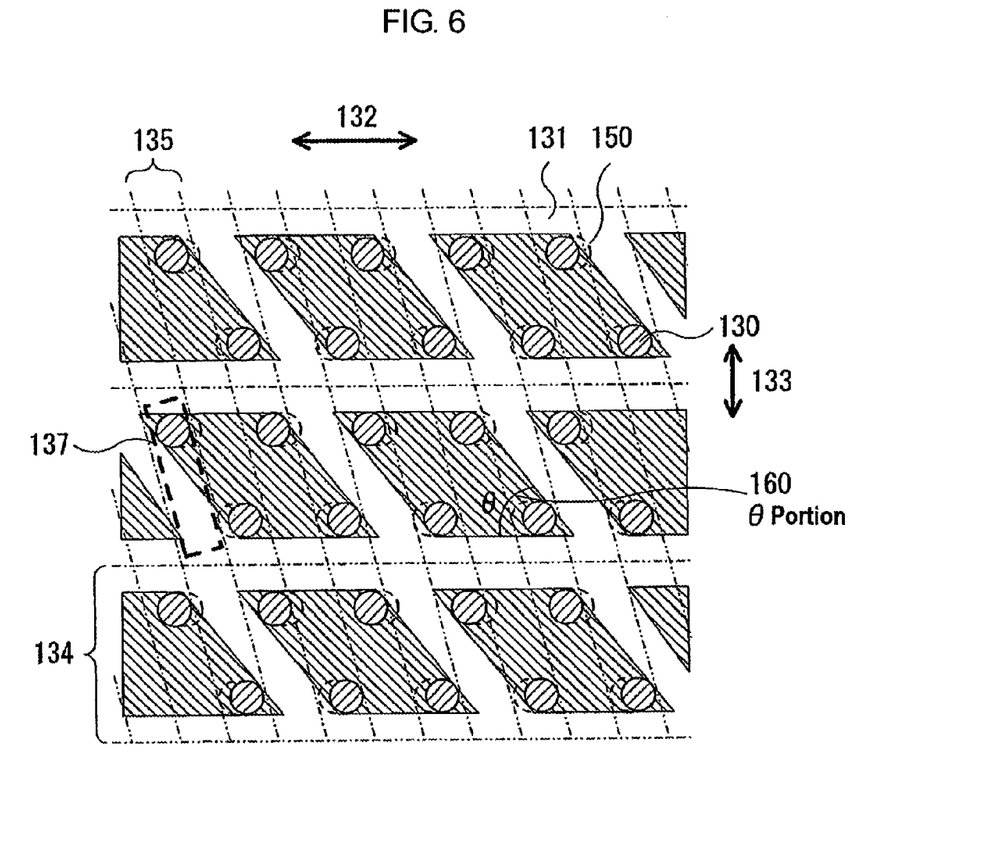
FIG. 6 is a schematic view showing an example in which the parallelogram of the magnetic dot alignment cavity portion is changed when the skew angle changes, in order to explain an embodiment of the invention.

FIGS. 5 and 6 are schematic enlarged views showing a part of an upper surface of the magnetic recording medium for explaining a pattern of magnetic dots in the magnetic recording medium according to the invention. FIG. 5 exemplifies the case where a skew angle is 0°. FIG. 6 exemplifies the case where the skew angle is 15°. Magnetic dots 130 are formed discretely in a non-magnetic substance 131 in accordance with a desired rule. Arrows in FIGS. 5 and 6 show a track direction 132 of the magnetic recording medium and a radial direction 133 of the magnetic recording medium, respectively. Each region sectioned by a track width 134 and a bit width 135 is a region where one bit is formed. Each bit can be recorded based on one magnetic dot.

Each magnetic dot alignment cavity portion 140 is provided for arranging each magnetic dot 130 in a desired position. A part of the non-magnetic substance 131 formed on the magnetic recording medium is formed so as to be lower than its peripheral portion. As a method for forming the cavity portion 140, for example, there can be used a method in which the thickness of the non-magnetic substance 131 per se is reduced in the cavity portion 140 or a method in which a cavity is provided in a substrate for forming the non-magnetic substance 131 in advance and the non-magnetic substance 131 is formed on the substrate to thereby provide the cavity portion 140. The magnetic dots 130 can be arranged in desired positions based on a level difference provided in the non-magnetic substance 131.

The shape of each cavity portion 140 is selected suitably in accordance with the pattern of arrangement of the magnetic dots 130. Each magnetic dot 130 can be arranged particularly easily in a region where two sides of the level difference of the cavity portion intersect each other. Accordingly, a polygon connecting positions where magnetic dots 130 are arranged is used preferably. Any polygon such as a trigon, a tetragon may be selected suitably in accordance with the formability of the cavity portion. It is preferable that a tetragon is used in consideration of the necessity of arranging magnetic dots 130 linearly in the track direction and the fact that arrangement of the largest possible number of magnetic dots 130 in one cavity portion 140 makes micro-fabrication easy.

FIGS. 5 and 6 show an example in which each parallelogram connecting magnetic dots 130 is used. Each parallelogram has the track direction 132 as a direction of one side, and a direction connecting magnetic dots 130 of bits adjacent in the track direction as a direction of the other side. An angle (θ) 160 between the two sides of each parallelogram is set in accordance with the skew angle, the track width and the bit width. In the example shown in FIG. 5, the angle θ is set to be 60° when the skew angle is 0°. In this case, the angle θ becomes smaller than 60° when the skew angle becomes larger than 0° as shown in FIG. 6. On the contrary, when the skew angle becomes smaller than 0°, the angle θ becomes larger than 60°. FIG. 6 shows the position 150 of each magnetic dot 130 at the skew angle of 0° for reference.

It is preferable that the angle (θ) 160 between the two sides of each parallelogram is set in accordance with each track. This is because the skew angle varies continuously according to the radial position of each track. As for a method of changing the angle (θ) 160, the angle (θ) 160 between the two sides of each parallelogram can be changed easily in accordance with each track as long as a master disc is produced by an electron beam drawing method or the like when, for example, each cavity portion 140 is formed by a nano-printing method.

On the other hand, when a plurality of master discs are used for forming each cavity portion 140, it is preferable that the number of shapes of the cavity portions 140 is made as small as possible in consideration of easiness of micro-fabrication. Accordingly, it is preferable that a plurality of tracks adjacent in the radial direction are lumped together to set a track group and the shape of the cavity portion 140 is set appropriately in accordance with the track group. The angle (θ) 160 between the two sides of each parallelogram is set in accordance with the skew angle of any track in the track group. Because the skew angle varies continuously in the radial direction, it is particularly preferable that the angle (θ) 160 is set to be equal to the skew angle in accordance with a track in the center of the track group.

In this manner, lowering of information read/write accuracy caused by interference of the projection of the head RW element with adjacent bits is suppressed while micro-fabrication is kept easy.

Preferably, each recording bit is formed from one magnetic dot 130. Further preferably, adjacent magnetic dots 130 are formed so discretely that magnetic interaction between magnetic dots 130 can be reduced. It is therefore preferable that magnetic dots 130 are arranged zigzag as shown in FIG. 6 and FIGS. 7A to 7G. More specifically, it is preferable that magnetic dots 130 are arranged alternately in opposite end directions of the track width between adjacent bits. When the cavity portion 140 in accordance with the skew angle is used, only one single magnetic dot 130 is arranged in the portion of the projection 137 of the head RW element so that one recording bit can be formed from one magnetic dot 130.

As for the method for forming magnetic dots 130, voids having the same shape as the magnetic dots 130 may be formed in the non-magnetic substance 131 and then a magnetic material may be formed in the void portions. The method for forming the magnetic dots 130 will be described more in detail with reference to FIGS. 7A to 7G.

Although the case where only one surface of the substrate is processed is taken as an example in FIGS. 7A to 7G for the sake of easy understanding, it is also possible to process both surfaces of the substrate. FIGS. 7A to 7G show an example in which: an aluminum film is used as a non-magnetic substance 131; voids are formed in the aluminum film by a nano-hole forming method using a nano-printing method; and a magnetic material is deposited in the voids to thereby form magnetic dots 130.

An underlying film 202 is formed on a non-magnetic substrate 201 of glass etc. by a sputtering method or the like. The underlying film 202 is a film for making next formation of an aluminum film 203 good. Although a single layer or a multi-layer may be used as the underlying film 202, it is preferable that a multi-layer is used as the underlying film 202. For example, it is preferable that a layer for improving adhesion to the substrate 201 is used as a first layer while a layer for improving formability of the aluminum film 203 is used as a second layer. Titanium, chromium or the like can be used as the first layer. Noble metal such as platinum, gold, ruthenium can be used as the second layer. When any one of these materials is used as the second layer, electrically conducting property can be given and corrosion resistance can be improved. In addition, a soft magnetic film made of an alloy such as cobalt, iron, nickel can be also provided between the first and second layers in order to improve recording/reproducing characteristic.

Figure 7A:
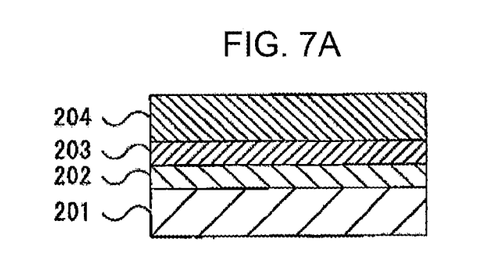
FIG. 7A shows applying a UV imprint resist on the aluminum film.
Figure 7B:
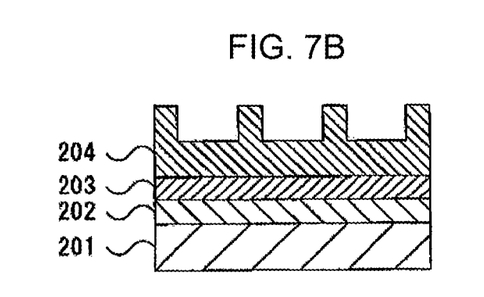
FIG. 7B shows patterning the resist.

The aluminum film 203 is formed on the underlying film 202. Successively, as shown in FIG. 7A, a UV imprint resist 204 is applied on the aluminum film 203 by a method such as spin coating. Successively, as shown in FIG. 7B, the resist 204 is patterned by a nano-printing method to thereby provide concaves and convexes in the resist with positions and shapes corresponding to the magnetic dot alignment cavity portions 140.

Figure 7C:
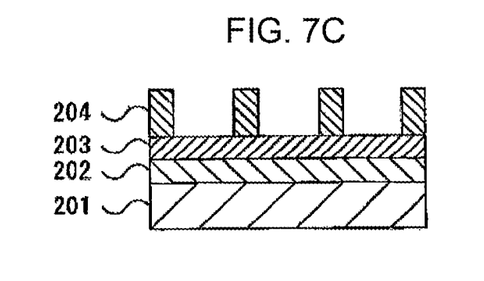
FIG. 7C shows removing a remaining film in the bottom of the resist.
Figure 7D:
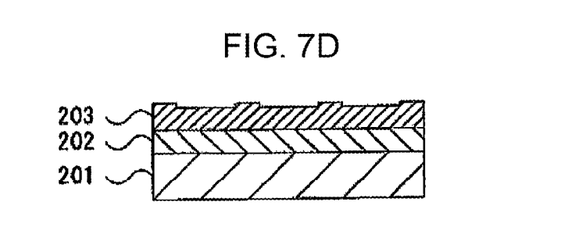
FIG. 7D shows producing a level difference in the aluminum film.

Successively, as shown in FIG. 7C, a remaining film in the bottom of the resist is removed by a method such as reactive ion etching. Successively, as shown in FIG. 7D, a level difference is produced in the aluminum film 203 by ion beam etching or the like using the resist mask, and at the same time, the resist mask is removed.

Figure 7E:
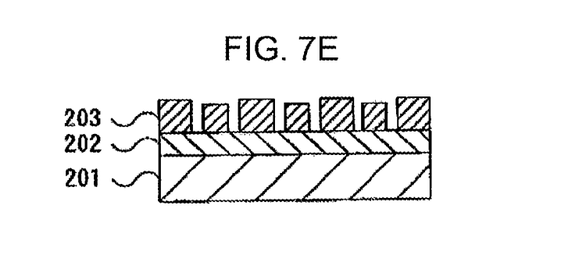
FIG. 7E shows forming nano-holes.

Successively, as shown in FIG. 7E, nano-holes are formed by an anodic oxidation method. In this process, nano-holes are formed and self-assembled in the vicinities of corners of cavities of the aluminum film which are the magnetic dot alignment cavity portions 140. The nano-holes may be successively subjected to etching or the like so that the diameter of each nano-hole is enlarged.

Figure 7F:
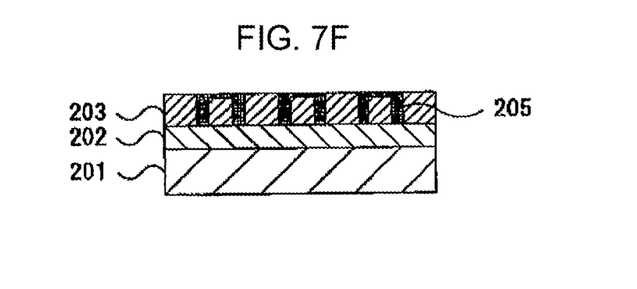
FIG. 7F shows forming a magnetic material in each nano-hole.
Figure 7G:
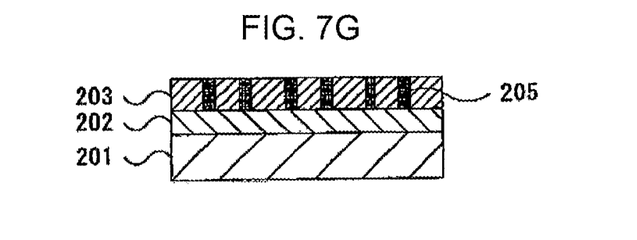
FIG. 7G shows grinding the surface to obtain a pattern of magnetic dots.

Successively, as shown in FIG. 7F, a magnetic material 205 is formed in each nano-hole by an electroplating method or the like. Successively, as shown in FIG. 7G, the surface is ground to thereby obtain a pattern of magnetic dots 130 in which the nano-holes are separated individually.

A film for protecting the magnetic layer may be formed on the magnetic layer formed thus.

An example will be described more in detail.

Example 1

A glass substrate 201 having an inner diameter of $\phi$20 mm, an outer diameter of $\phi$65 mm and a thickness of 0.635 mm was prepared as the substrate. After the glass substrate was washed well, an underlying film 202 of two layers was formed on the substrate by a sputtering method. First, a titanium film having a thickness of 10 nm was formed. Successively, a gold film having a thickness of 12 nm was formed. Successively, an aluminum film 203 having a thickness of 20 nm was formed by a sputtering method.

Successively, as shown in FIG. 7A, a UV imprint resist film 204 having a thickness of 60 nm was applied on the aluminum film by a spin coating method. PAK-01-60 made by Toyo Gosei Co., Ltd. was used as the UV imprint resist.

Then, as shown in FIG. 7B, the resist was patterned into concave-convex shape by a nano-printing method. A master disc used in nano-printing was produced as follows. First, a Cr film was formed on quartz glass and an electron beam drawing resist was applied on the Cr film. Successively, the resist with a pattern of the shapes of the magnetic dot alignment cavity portions was exposed and developed by an electron beam drawing method to thereby form a resist pattern. Successively, the Cr film was patterned and successively a predetermined pattern of a parallelogram was processed in the quartz glass by dry etching with the Cr film as the mask to obtain a quartz stamper. Successively, the surface of the quartz stamper was coated with a fluorochemical release agent (DURASURF HD-1100, made by Daikin Chemicals Sales Co., Ltd.). Successively, the quartz stamper was pressed against the resist film 204 of the substrate uniformly under a pressure of 3 kN for 60 seconds, and then the quartz stamper was separated from the substrate so that the concave-convex shape of the quartz stamper was transferred to the resist 204. Incidentally, the cavity portion 140 was produced to have a width of 65 nm in the radial direction, a pitch of 80 nm and a pattern depth of 40 nm.

Then, as shown in FIG. 7C, reactive ion etching using $CF_4$ gas was performed to thereby remove the remaining film of the bottom of the resist produced by the nano-printing method.

Then, as shown in FIG. 7D, a level difference of 3 nm was formed in the aluminum film by ion beam etching using the resist mask, and then the resist mask was removed by $CF_4$ gas.

Then, as shown in FIG. 7E, nano-holes were formed. The nano-holes were formed by anodic oxidation in a solution containing 0.3 mol % of oxalic acid under an anodizing voltage of 3V. The anodic oxidation was stopped when the bottom of each nano-hole reached the gold film. In this manner, nano-holes were formed and self-assembled in the vicinities of corners of each cavity of the aluminum film. Etching was further performed in a solution containing 5 wt % of phosphoric acid to enlarge the diameter of each nano-hole. Thus, nano-holes with a diameter of $\phi$12 nm were obtained in four corners of each magnetic dot alignment cavity portion 140 substantially shaped like a parallelogram.

Then, as shown in FIG. 7F, cobalt which was a magnetic material was deposited in each nano-hole by an electroplating method.

Then, as shown in FIG. 7G, the surface was polished by a chemical mechanical polishing method (CMP) to thereby obtain a pattern in which cobalt of each nano-hole was separated from cobalt of the other nano-holes. That is, there was obtained a pattern having a structure in which magnetic dots were located at positions corresponding to respective bits and separated from each other by a non-magnetic substance.

Finally, though not shown, a carbon protective film was formed by a CVD method and a lubricant was applied on the carbon protective film by a dipping method to thereby obtain a patterned magnetic recording medium.

Signal evaluation based on a magnetic recording head was applied to the patterned medium produced thus. As a result, a signal having a period corresponding to the formed magnetic dot could be obtained in the whole region ranging from the inner circumference to the outer circumference of the medium.

What is claimed is:

1. A patterned magnetic recording medium, including a plurality of magnetic dots, each corresponding to a recording bit, formed on a non-magnetic material, the patterned magnetic recording medium comprising:
 an aluminum layer on a substrate made of the non-magnetic material; and
 a plurality of polygonal cavity portions in the aluminum layer,
 wherein each of the plurality of polygonal cavity portions extends across a width of more than one said recording bit in a track direction of the recording medium, and
 wherein the plurality of magnetic dots are formed only in corners of the plurality of polygonal cavity portions.

2. The patterned magnetic recording medium of claim 1, wherein each of the plurality of cavity portions is of a shape of a parallelogram.

3. The patterned magnetic recording medium of claim 1, wherein one side of each polygonal cavity portion is parallel to a recording track, and another side of each polygonal cavity portion is parallel to an angle different from a direction parallel to a skew direction of the recording track to accommodate a plurality of magnetic dots each corresponding to a recording bit.

4. The patterned magnetic recording medium of claim 1, wherein the aluminum layer is formed directly on the substrate made of the non-magnetic material.

* * * * *